W. MORRISON.
GRID FOR REVERSIBLE GALVANIC BATTERIES.
APPLICATION FILED SEPT. 26, 1910.
976,824.
Patented Nov. 22, 1910.
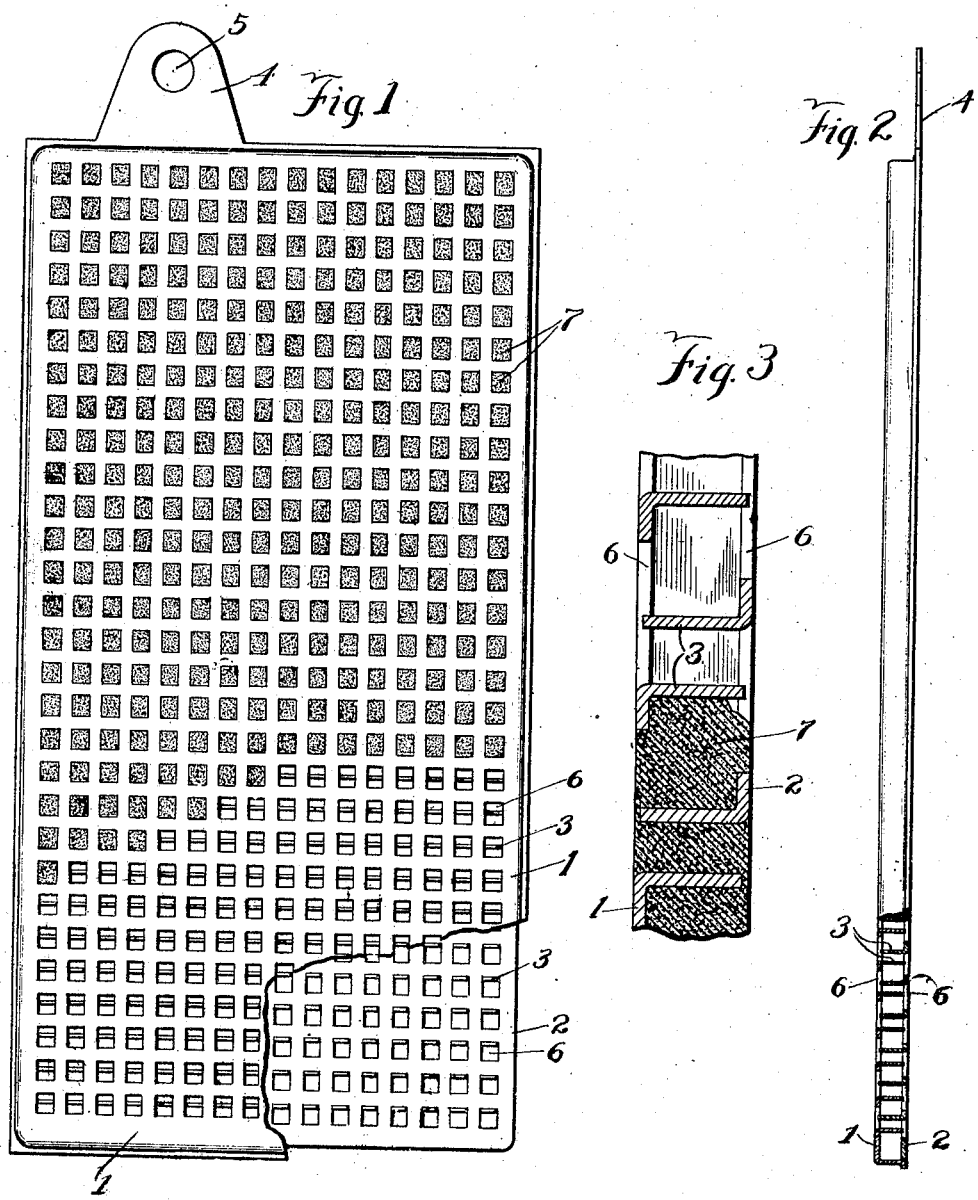

UNITED STATES PATENT OFFICE.

WILLIAM MORRISON, OF DES MOINES, IOWA.

GRID FOR REVERSIBLE GALVANIC BATTERIES.

976,824.   Specification of Letters Patent.   Patented Nov. 22, 1910.

Application filed September 26, 1910. Serial No. 583,709.

*To all whom it may concern:*

Be it known that I, WILLIAM MORRISON, a citizen of the United States of America, and resident of Des Moines, Polk county, Iowa, have invented a certain new and useful Improvement in Grids for Reversible Galvanic Batteries, of which the following is a specification.

My invention relates to grids for reversible galvanic batteries, and more particularly to an improved method of making the same.

An object of my invention is the construction of an improved grid having a high interior conductivity and capable of holding a large amount of active material.

A further object is to construct a grid cheaply and quickly.

A further object is to construct a grid which is particularly adapted to be used in connection with an alkaline electrolyte.

In storage battery construction it is desirable, in order to obtain the best results, that the potential of every point in the active material be as near as possible to that of the terminal to which the grid holding the same is connected. It has, therefore, been necessary heretofore to construct the grid very thin, so that the distance between the conducting sides of the grid and any point in the active material would not be excessive. Accordingly it has not been possible to place a large amount of active material on each plate or grid. By my improved construction, however, I provide a plurality of conducting projections which are stamped out of the plates, and which extend from the two sides into the active material, thus giving my improved grid a high interior conductivity, and allowing the grid to be constructed thicker and thus capable of holding more active material without having any point in the material an excessive distance from a conductor which is connected to the terminal of the battery. Moreover, the active material is forced around these projections so that they are embedded in the same, so as to hold the plates securely together and prevent buckling.

These and other objects of my invention will be clearly understood by reference to the accompanying drawings, in which—

Figure 1 is a plan view of my improved grid partly broken away to show the interior construction. Fig. 2 is a section taken on line 2—2 of Fig. 1. Fig. 3 is an enlarged detail section.

Having reference to the drawings, my improved grid comprises two sections, 1 and 2. The section 1 is pan-shaped, as shown, and is constructed as follows: A sheet of metal, preferably copper, or any other suitable material, of the desired size, is first placed in a die and the sides turned up in the manner shown. Then a plurality of openings 6 are stamped in the sheet by cutting away three sides of each opening and then bending the material back on the remaining side until it is substantially perpendicular. This cutting away and bending is all accomplished by a single operation of a suitable stamping machine. The plate 2 is then constructed in substantially the same manner, except that it is left in a flat condition. The plate 1 is then placed face upward in a suitable die and the active material 7 placed on the same. A weighed amount of the active material is employed, and being in a loose state when laid in the plate it is piled up evenly above the lower plate. Then the plate 2 is placed on top of the active material in the plate 1 and the projections 3 pressed into the material. Then a powerful pressure is applied, as by a hydraulic press, and the plate 2 pressed down on the plate 1 until they are pressed together in the manner shown in the drawings. The projections in the plate 2 should be so positioned that in the completed plate they pass through, or substantially through, the openings in the plate 1, and likewise the projections on the plate 1 pass through the openings in the plate 2. These projections may contact with the opposite plate, as clearly shown in Fig. 1 of the drawings, and in the use of certain active materials where the conductivity of such active material is low, such contact is quite essential. Where the active material has a high conductivity however such contact is not essential. The plate 2 contacts with the plate 1 at its edges, and the plate 1 is connected to the terminal of the battery by means of a suitable bolt or other connecting means passing through the opening 5 in the projection 4. It will thus be seen that the projections 3 produce a high internal conductivity so that all points in the active material are substantially of the same potential as the electrode to which they are connected. It will further be noted that in the construction of my improved grid there is no waste material, the part of the plates which are stamped out to form the openings being bent upward to form the projections.

The material of which this grid is constructed may be of various metals, such as copper, nickel or iron, or other suitable metals, depending largely upon the active material used in combination therewith. Therefore, I do not wish to limit myself to any one particular metal.

What I claim as my invention is:

1. A pressed or stamped grid for use in reversible batteries, in which an alkaline electrolyte is used, comprising a bottom section having a plurality of openings stamped therein and projections extending upwardly therefrom, an upper section having a plurality of openings therein and projections extending downwardly therefrom, the projections of one plate extending substantially through the openings in the other plate.

2. A pressed or stamped grid for use in reversible batteries, in which an alkaline electrolyte is used, comprising two plates or sections between which the active material is held, a plurality of openings stamped in each plate and a plurality of projections on each plate extending into the openings in the opposite plate.

3. A pressed or stamped grid for electric batteries in which an alkaline electrolyte is used, comprising a plurality of substantially rectangular plates between which the active material is held, and a plurality of conducting projections extending from each of said plates at substantially right angles into said active material.

4. A pressed or stamped grid for electric batteries in which an alkaline electrolyte is used, comprising a plurality of plates between which the active material is held, and a plurality of conducting projections extending into said material, whereby a high internal conductivity is obtained.

5. A pressed or stamped grid for use in reversible batteries, in which an alkaline electrolyte is used, comprising a bottom section having a plurality of openings stamped therein and projections extending upwardly therefrom, an upper section having a plurality of openings therein, and projections extending downwardly therefrom.

6. A pressed or stamped grid for galvanic batteries in which an alkaline electrolyte is used, comprising a plurality of plates between which the active material is firmly pressed, each plate having portions thereof stamped out and bent inward so as to extend into and be surrounded by said active material.

7. A pressed or stamped grid for use in reversible batteries in which an alkaline electrolyte is used, a plurality of plates between which the active material is held, a plurality of conducting projections extending from each plate into the active material, the ends of the projections of one plate extending past the ends of the projections of the other plate.

8. A pressed or stamped grid or support for galvanic batteries in which an alkaline electrolyte is used, comprising a plurality of plates between which the active material is firmly pressed, each plate having portions thereof stamped out and bent inward so as to extend into and be surrounded by said active material, the ends of the stamped out portions of one plate extending past the ends of the stamped out portions of the other plate.

9. A pressed or stamped grid for use in reversible batteries in which an alkaline electrolyte is used, comprising two plates or sections between which the active material is held, a plurality of openings stamped in each plate and a plurality of projections on each plate extending into the openings in the opposite plate, the edges of the projections contacting with the sides of the said openings.

10. A pressed or stamped grid for use in reversible batteries, in which an alkaline electrolyte is used comprising two plates or sections between which the active material is held, a plurality of openings stamped in each plate, and a plurality of projections on each plate extending toward the opposite plate and contacting with the same.

Signed by me at Chicago, Illinois, this 22d day of Sept. 1910.

WILLIAM MORRISON.

Witnesses:
ELLEN H. CLEGG,
WM. B. DURMON.